D. J. DEMAS.
TIRE CASING.
APPLICATION FILED JAN. 14, 1919.
1,261,013.
Patented Apr. 2, 1918.
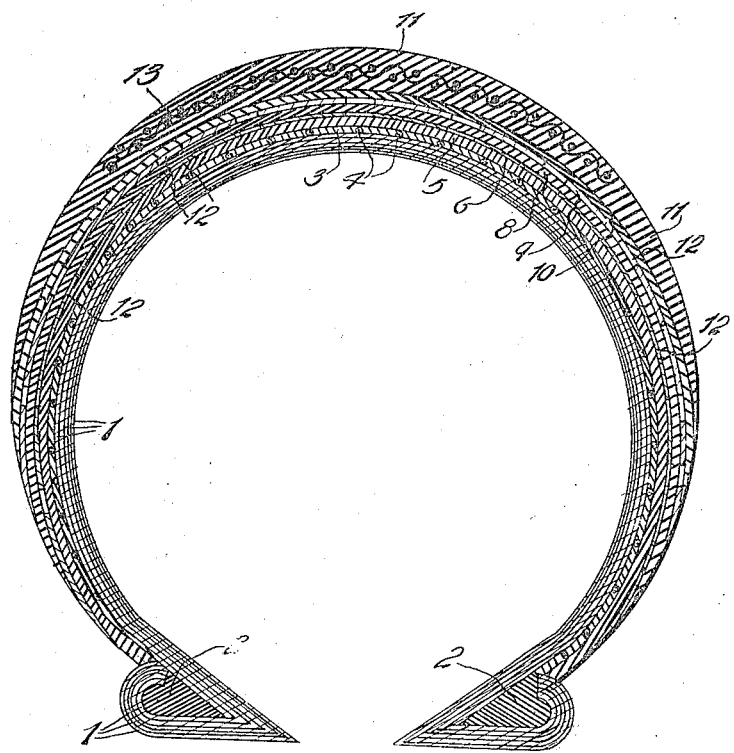

UNITED STATES PATENT OFFICE.

DEMETREOS J. DEMAS, OF PITTSBURGH, PENNSYLVANIA.

TIRE-CASING.

1,261,013.

Specification of Letters Patent.  Patented Apr. 2, 1918.

Application filed January 14, 1918. Serial No. 211,858.

*To all whom it may concern:*

Be it known that I, DEMETREOS J. DEMAS, a citizen of the United States, residing at Pittsburgh, in the county of Allegheny and State of Pennsylvania, have invented certain new and useful Improvements in Tire-Casings, of which the following is a specification.

My invention relates to improvements in tire casings or shoes, of the internal armor type.

An important object of the invention is to provide a tire casing or shoe of the above mentioned character, which is strong, durable, and puncture proof to a high degree.

Other objects and advantages of the invention will be apparent during the course of the following description.

In the accompanying drawing forming a part of this specification, the figure is a transverse sectional view through a tire casing or shoe embodying my invention.

In the drawing, wherein for the purpose of illustration is shown a preferred embodiment of my invention, the numeral 1 designates a plurality of layers of fabric, coated with rubber, and constituting the body portion of the casing. The layers of fabric 1 are extended or bent about heels 2, as shown.

Arranged upon the outermost strip 1, is a strip 3, which I term a "breaker." This "breaker" is formed of rubber having a cord 4 or other fibrous material embedded therein. Arranged upon the breaker 3 is a strip or layer of rubber 5, having a strip or layer of fiber 6, disposed thereon. Disposed upon the fiber 6 is a strip or layer of rubber 8, having a strip or layer of fiber 9 arranged thereon. Arranged upon the strip or layer of fiber 9 is a strip or layer 10 of rubber, receiving thereon a layer 11 of rubber constituting the tread portion of the casing. The fiber employed in the construction of my tire casing is the composition ordinarily termed "fiber" and used principally as insulating material. This fiber is strong, tough, and when formed in thin sheets possesses a desired degree of flexibility. The strips or layers of fiber are preferably provided with openings 12, in order that the material of the layers of rubber may pass therethrough, during the process of vulcanization, so that all portions of the tire casing form in effect a single unit.

The numeral 13 designates a strip or layer of wire fabric, such as a copper wire fabric. This wire fabric is embedded within the tread portion 11 and is arranged outwardly of the layers of rubber and fabric, serving to protect the same and imparting strength to the tread portion.

When the several layers or strips constituting the tire casing are assembled and secured together, it is obvious that the entire unit is suitably vulcanized, whereby the several strips become securely united, forming in effect an integral structure. The openings 12 in the fiber strips or layers allow of the material of the rubber strips passing therethrough, thus serving to secure the strips directly together. The fiber strips also become securely cemented or vulcanized to the rubber layers or strips.

From the foregoing description it is believed that the construction of my tire casing is obvious and no further explanation is deemed necessary.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A tire casing comprising a plurality of layers of rubber coated fabric secured together and arranged innermost for constituting the body portion of the casing, a breaker strip arranged upon the outer surface of the outermost strip of fabric, a layer of rubber arranged upon the outer surface of the breaker, a layer of fiber arranged upon the outer surface of the layer of rubber and having openings formed therein, a layer of rubber disposed upon the outer surface of the fiber, a layer of fiber arranged upon the outer surface of the second named layer of rubber, a layer of rubber arranged upon the outer surface of the second named layer of fiber, and a metallic fabric embedded within the last named layer of rubber.

In testimony whereof I affix my signature in presence of two witnesses.

DEMETREOS J. DEMAS.

Witnesses:
D. K. FERREE,
JAMES P. KIRK.